UNITED STATES PATENT OFFICE.

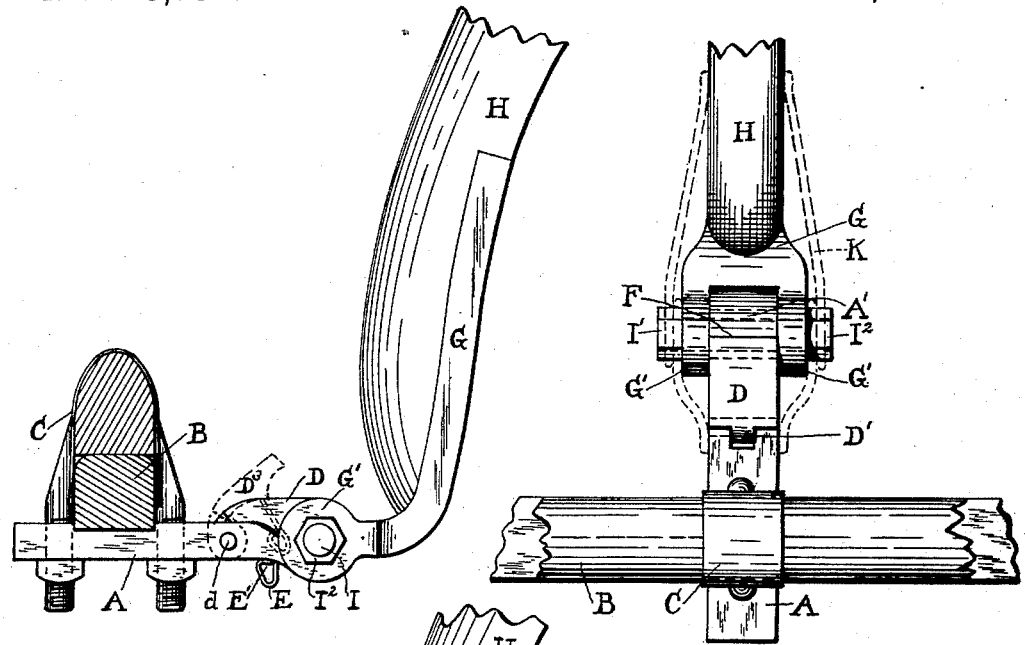
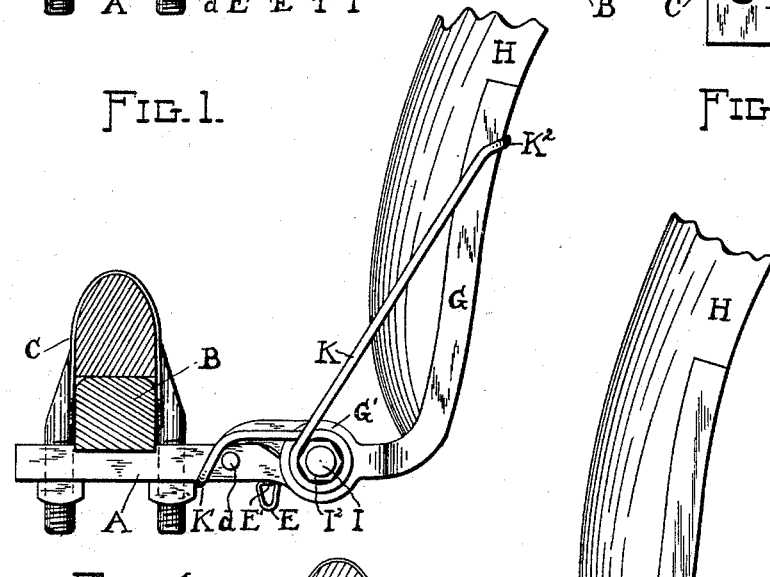
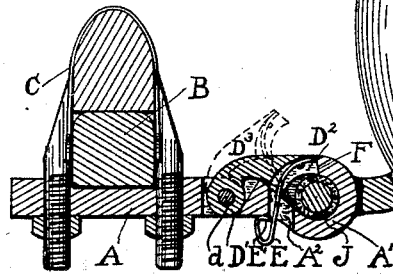

EDWIN F. HOPKINS, OF CLEVELAND, OHIO, ASSIGNOR TO SAMUEL DE GROW, OF SAME PLACE.

THILL-COUPLING.

SPECIFICATION forming part of Letters Patent No. 485,194, dated November 1, 1892.

Application filed January 25, 1892. Serial No. 419,237. (No model.)

*To all whom it may concern:*

Be it known that I, EDWIN F. HOPKINS, a citizen of the United States, residing at Cleveland, in the county of Cuyahoga and State of Ohio, have invented a certain new and useful Detachable Carriage-Shaft Supporter and Anti-Rattler, of which the following is a full, clear, and complete description.

The nature of the invention consists in the several parts in connection with a spring by which the carriage-shafts may be conveniently attached to the axle and detached therefrom, and when attached the shafts are supported by springs to relieve the horse from the load of the shafts.

That the invention may be seen and fully understood by others, reference will be had to the following specification, and annexed drawings, forming a part thereof.

Figure 1 is a side view of said invention; Fig. 2, a top view with the spring in dotted lines. Fig. 3 is a longitudinal section, and Fig. 4 a side view showing the spring in full.

Like letters of reference designate like parts in the drawings and specification.

In the ordinary application of my invention two shaft-supports are used—one at each part of the axle near the hub—in connection with the thills or shafts. In the description one only of the shaft-supports is shown and described to avoid prolixity.

The bar A is attached to the axle B by the clip C and its screw-and-nut fastenings, as shown in Fig. 1. One end of the bar A is shaped to a curved hook or rounded terminal A', Figs. 2 and 3. The dog D is pivoted at $d$ to the bar A, as shown in Figs. 1, 2, 3, and 4, by the ear D', which is received into a slot in said bar. The forward part $D^2$, Fig. 3, of the dog D is grooved or channeled to receive the upper portion of the spring E, which is fastened thereto. When closed, the front surface of the dog is held firmly against the terminal of the hook A' to form the joint F, Fig. 3, by the spring E, which bears with its flange E' against the under surface of the bar A, and the dog D cannot be raised until the lower portion of the spring E is pushed forward sufficiently to allow the flange E' to enter the slot $A^2$ in the bar A, when the dog D is thrown up into the position indicated by the dotted lines $D^3$ in Figs. 1 and 3. The draw-bar G, to which is attached the shaft H, is curved at its lower extremity, which is divided into two ears G'. (Best shown in Fig. 2.) The bolt I, covered between the ears G' with rubber or other suitable packing J, Fig. 3, passes centrally through said ears and is held firmly in place by the bolt-head I' and the nut $I^2$. The hook A' of the bar A receives the bolt I and is at the same time received between the ears G', which form integral parts of the draw-bar G. The dog D when closed holds the parts firmly in place and the packing J prevents any tendency to rattle. All lateral movement is prevented by the close joint formed by the hook A' with the ears G'. It will be readily seen that when the dog D is thrown open, as indicated by the dotted lines $D^3$, the draw-bar G may be easily detached from the bar A and as easily attached again when the dog D is closed and the joint is complete. The spring K, Figs. 2 and 4, having its fulcrum on the under side of the bar A at K', is coiled around the bolt-head I' and the nut $I^2$ and forms a bearing thereon, from which it passes to the opposite side of the draw-bar G at $K^2$, supporting the same, with the shaft H, attached thereto by reason of the well-known principle of the lever. The bolt-head I' and the nut $I^2$ project beyond the spring K sufficiently to permit of their being grasped by a wrench.

What I claim, and desire to secure by Letters Patent, is—

In a thill-coupling, a dog D, provided with a flange-spring E, said dog D pivoted to the hooked draw-bar A, and the spring E, operating through an opening in said draw-bar, in combination with the draw-bar G, bolt I, and spring K, substantially in the manner and for the purpose set forth.

In testimony whereof I affix my signature in presence of two witnesses.

EDWIN F. HOPKINS.

Witnesses:
 WALTER A. BIDDLE,
 F. GRISWOLD.